Feb. 27, 1968    G. McCLURE    3,371,172
HAZARD WARNING SWITCH WITH SELF-CATCHING CONSTRUCTION
Filed June 29, 1966    2 Sheets-Sheet 1
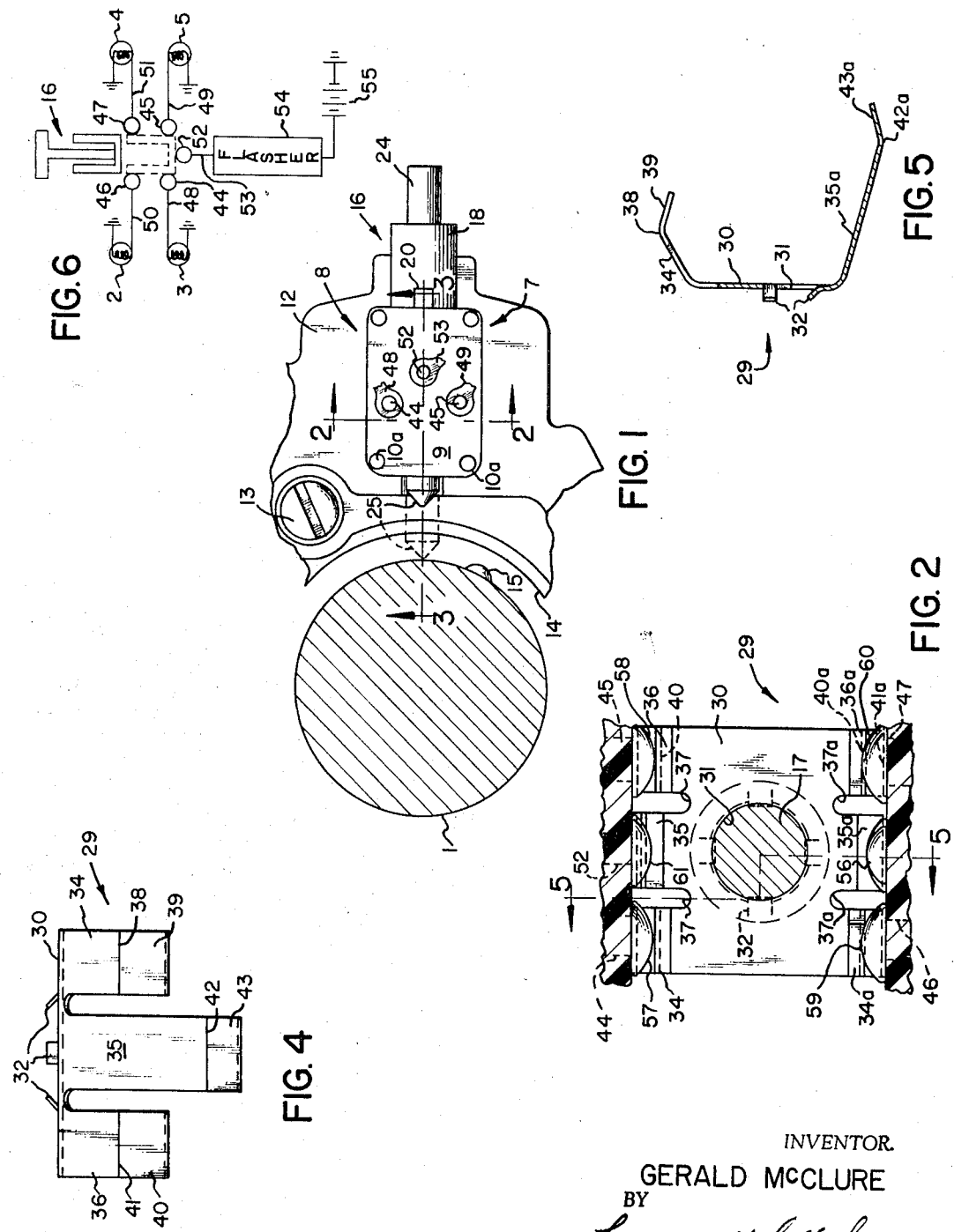
INVENTOR.
GERALD McCLURE
BY
*Learman & McCulloch*
ATTORNEYS Feb. 27, 1968  G. McCLURE  3,371,172
HAZARD WARNING SWITCH WITH SELF-CATCHING CONSTRUCTION
Filed June 29, 1966  2 Sheets-Sheet 2

INVENTOR.
GERALD McCLURE
BY
Larman & McCulloch
ATTORNEYS

United States Patent Office 3,371,172
Patented Feb. 27, 1968

3,371,172
HAZARD WARNING SWITCH WITH SELF-CATCHING CONSTRUCTION
Gerald McClure, Warren, Mich., assignor to Boyne Products, Inc., Boyne City, Mich., a corporation of Michigan
Filed June 29, 1966, Ser. No. 561,620
13 Claims. (Cl. 200—61.54)

ABSTRACT OF THE DISCLOSURE

A self-latching switch having a casing provided with fixed contacts engageable by resilient contacts carried by a reciprocable operator that is biased by a spring to one position. The engagement between the resilient and fixed contacts when the operator is in a second position disables the spring and latches the operator in its second position. The operator includes a part on which force may be applied to augment the force of the spring and initiate return movement of the operator to its first position.

This invention relates to an electrical switch construction and more particularly to a switch especially adapted for use in automotive vehicle signaling systems having left-hand and right hand indicators adapted for use selectively as direction indicators or hazard warning indicators.

Automotive vehicles currently in use conventionally have left-hand and right-hand indicators or lamps which selectively may be flashed to indicate a left-hand or right-hand turn, respectively. In some instances, the lamps at both sides of the vehicles may be flashed simultaneously so as to warn drivers of approaching vehicles of a potentially hazardous condition. In some vehicles the direction signaling lamps and the hazard warning lamps are the same, whereas in other vehicles the hazard warning lamps are independent of and in addition to the direction signaling lamps. In either case, it is desirable that the lamps utilized to indicate a hazardous condition be incapable of operating when the vehicle is moving.

In most vehicles there is a cam that is associated with the rotatable steering shaft or wheel in such manner as to rotate therewith for the purpose of canceling a left-hand or right-hand direction indicator signal. Such a cam conveniently can be used to cancel the hazard warning signal also, provided the latter is constructed and arranged to cooperate with the cam. A construction of this kind is disclosed in U.S. Patent No. 3,235,837, granted Feb. 15, 1966.

In the construction of self-canceling hazard warning switchgear, it is possible to effect certain advantages and economies by forming parts of the direction signaling apparatus integrally with parts of the hazard warning apparatus. In such constructions it is desirable to effect operation of the two switch devices by the canceling cam with as little stress or force as possible so as to avoid the imposition of strain on any part other than that which is engaged by the cam.

An object of this invention is to provide a switch which is capable of operating a vehicle's hazard warning signal when the vehicle is stationary and which is operable automatically by the vehicle's direction signal canceling means to disable the hazard warning lamps when the vehicle is being driven.

Another object of the invention is to provide an improved switch of the character described having means for latching the switch in its operative position and wherein the switch is exceptionally easily unlatched in response to normal movements of a vehicle's steering mechanism.

A further object of the invention is to provide a reciprocable switch having engageable and disengageable contacts and in which the contacts themselves not only establish an electrical circuit, but also function as latching means for releasably maintaining the switch in an operating position.

Other objects of the invention will be pointed out specifically or will become apparent from the following description when it is considered in conjunction with the appended claims and the accompanying drawings, in which:

FIGURE 1 is a fragmentary view partly in plan and partly in section of a switch constructed in accordance with the invention and mounted in cooperative relation with a part of a vehicle's steering mechanism;

FIGURE 2 is an enlarged, sectional view taken on the line 2—2 of FIGURE 1;

FIGURE 4 is a top plan view of a movable switch member constructed in accordance with the invention;

FIGURE 5 is a sectional view taken on the line 5—5 of FIGURE 2; and

FIGURE 6 is a schematic wiring diagram.

Figure 3:
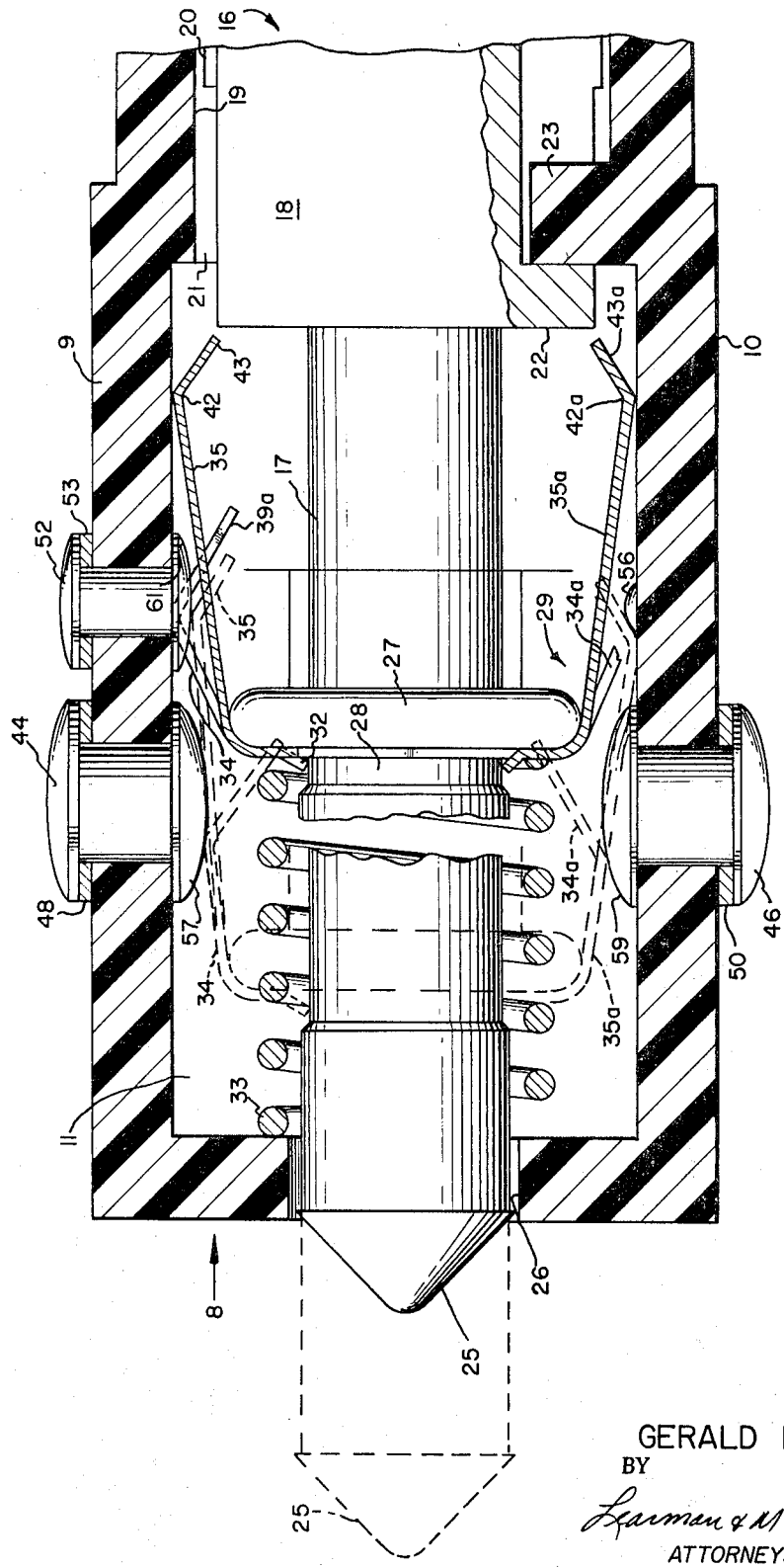
FIGURE 3 is a greatly enlarged, longitudinal sectional view taken on the line 3—3 of FIGURE 1.

Apparatus constructed in accordance with the invention is adapted for use in conjunction with a vehicle (not shown) having a rotatable steering shaft 1 by means of which the steerable wheels may be controlled. The vehicle also is provided with a left-front signaling lamp 2, a left-rear signaling lamp 3, a right-front signaling lamp 4 and a right-rear signaling lamp 5. The signaling lamp may constitute the conventional direction signaling indicators or, if desired, may be independent of the direction signal lamps.

A switch constructed in accordance with the invention is designated generally by the reference character 7 and comprises a casing 8 having upper and lower parts 9 and 10, respectively, joined to one another by rivets 10a or the like so as to provide a walled, hollow cavity 11. The lower part 10 of the casing 8 may form an integral part of a support 12 which may be secured by screws 13 to a housing 14 surrounding the shaft 1 and adjacent a cam 15 rotatable with the shaft 1. The support 12 conveniently may form an integral part of a direction signal operating mechanism (not shown).

Reciprocably mounted in the casing 8 is an elongated operating member or carrier 16 having a shank 17 to one end of which is fixed an enlargement 18 that extends through an opening 19 at that end of the casing remote from the steering shaft 1. The enlargement 18 carries an axially extending rib 20 which is slidably received in a channel 21 formed in the opening 19 so as to preclude rotation of the operator 16 relatively to the casing. The enlargement 18 also is provided with a laterally projecting flange or finger 22 which cooperates with an upstanding lug 23 on the casing 8 to limit movement of the operator 16 to the right, as viewed in FIGURES 1 and 3. To the free end of the enlargement 18 is fixed a knob 24 by means of which the driver of the vehicle may reciprocate the operating member 16. The opposite end of the operator shank 17 is joined to a cone-shaped nose piece or actuator 25 which may be projected through an opening 26 in the casing 8 into the path of rotation of the cam 15.

Between the ends of the operating member 16 and within the casing 8 the shank 17 is provided with an annular flange 27. Immediately forwardly of the flange 27, i.e. toward the nose 25, the shank 17 is provided with an annular groove 28. Mounted on the shank 17 is an electrically conductive member 29 having a substantially planar wall portion 30 provided with a central aperture 31 of such size as to accommodate the shank 17, but which is smaller in size than the size of the flange 27. Thus, the wall 30 may be fitted snugly against the flange 27. Preferably, a plurality of lugs 32 are struck out from the portion 30 and are received in the groove 28 so as to prevent inadvertent separation of the members 16 and 29 during assembly operations.

Means is provided for biasing the operator member 16 and the conductor 29 to a retracted position as shown in full lines in FIGURE 3 and comprises a compression spring 33 which surrounds the shank 17 and has one end seated on the forward wall of the casing 8. The opposite end of the spring 33 seats on the wall portion 30 of the conductor 29 and maintains the latter snugly in engagement with the flange 27. The spring 33 reacts between the casing and the flange 27 so as constantly to exert a force on the operating member 16 to urge the latter to its retracted position.

The conductor 29 is provided with a plurality of resilient cantilever arms or fingers each of which is electrically conductive and each of which forms part of a latch mechanism as hereinafter will be explained more fully. The arms are arranged in vertically spaced pairs, their being three pairs of arms in all. One pair of arms is designated by the reference characters 34, 34a, a second, intermediate pair of arms is designated by the reference characters 35, 35a, and a third pair of arms is designated by the reference characters 36, 36a. The material from which the conductor 29 is made should be of high electrical conductivity and resilient or springy. One suitable material is beryllium copper alloy.

Between each of the arms 34, 35 and 36 is a slot 37, a similar slot 37a being located between each of the other arms of the pairs of arms. Each of the arms, therefore, is spaced from the others and is capable of flexing independently.

The arms 34, 34a diverge in a direction rearwardly of the wall portion 30 and are bent sharply intermediate their ends to form latching abutments 38, 38a. The terminal ends 39, 39a converge rearwardly of the respective abutments 38, 38a. The purpose of the abutments 38, 38a will be pointed out more fully hereinafter. The arms 36, 36a are identical to the arms 34, 34a and have converging terminal ends 40, 40a between which are sharply bent latching abutments 41 and 41a, respectively. The arms 35, 35a also diverge in a direction rearwardly from the wall 30 and are sharply bent adjacent their rear ends to provide converging terminal ends 43, 43a and latching abutments 42, 42a. The arms 35, 35a are considerably longer than the arms of the other pairs of arms and therefore are somewhat more flexible than the shorter arms.

Mounted in the upper half 9 of the casing 8 is a pair of laterally spaced, electrically conductive members or contacts 44 and 45 for engagement with the respective arms 34 and 36. A similar pair of laterally spaced conductive contacts 46 and 47 is mounted in the lower casing portion 10 for engagement by the contact arms 34 and 36a, respectively. The contacts 44 and 45 may be connected by conductors 48 and 49, respectively, to the rear signaling lamps 3 and 5, and the contacts 46 and 47 may be connected by similar conductors 50 and 51, respectively, to the front signaling lamps 2 and 4.

An electrically conductive contact 52 is fixed in the upper casing half 9 between the contacts 44 and 45 in a position to be engaged by the arm 35 and is connected by a conductor 53 through a conventional flasher unit 54 to one terminal of a battery or other source of electrical energy 55, the other terminal of which is grounded. Although it is not necessary, the lower casing half 10 may be provided with an integral rib 56 in a position to be engaged by the arm 35a.

The contact 44 has a crowned or otherwise non-planar abutment or latch surface 57 which projects into the casing cavity 11 for engagement by the contact arm 34. The contacts 45, 46, 47 and 52 have similar non-planar surfaces 58, 59, 60 and 61, respectively, for engagement with their respective contact arms.

Prior to assembly of the conductive member 29 and the casing 8, the arms of the conductive member assume a normal, unstressed position such that the spacing between the arms of each pair is greater than the spacing between the upper and lower walls of the cavity 11. Upon insertion of the member 29 in the casing, therefore, the respective pairs of contact arms will be stressed toward one another so that they constantly bear forcibly against the adjacent walls of the casing cavity 11.

During normal operation of the vehicle, the operating member 16 is in an inactive or retracted position as shown in full lines in FIGURES 1 and 3 in which the contact arms of the member 29 are free from their respective fixed contacts. In the event the vehicle becomes disabled, however, a force may be applied by the vehicle driver on the knob 24 so as to move the operating member to the left from the full line position shown in FIGURES 1 and 3 to the dotted line position. Such movement of the operating member will project the nose 25 of the operating member into the path of rotation of the cam 15, so as to be engaged thereby upon rotation of the shaft 1.

Movement of the operating member 16 from its inactive or retracted position to its projected, operative position also will cause the pairs of arms 34, 34a and 36, 36a to engage their respective fixed contacts. The arm 35 will engage its fixed contact 52, thereby completing an electrical circuit from the battery 55 through the flasher 54 to each of the signaling lamps 2, 3, 4 and 5 so as simultaneously to flash all four signaling lamps.

As the operating member 16 moves toward its operative position, the arms 34, 34a, 35 and 36, 36a traverse the inwardly projecting surfaces of the respective fixed contacts 57, 61, 58, 59 and 60 and are further stressed inwardly of the casing. The length of travel of the operating member 16 to its fully projected position is such that the latching abutments of the respective arms will pass the point of maximum projection of the fixed contacts into the casing cavity 11, as is indicated by the dotted lines in FIGURE 3, whereupon the arms of the member 29 may expand in a direction outwardly of the casing, i.e., in a plane normal to the path of movement of the operator 16. Any attempt to move the operating member 16 to the right from the dotted line position shown in FIGURE 3, therefore, will require compression of the flexible arms of the conductor 29. The capacity of the spring 33 is such that, were it not for the cooperation between the fixed contacts and the movable contact arms, the spring would be capable of returning the operator 16 to its retracted position from any other position. The thickness and rigidity of the respective flexible arms and the slope or inclination of the respective fixed contacts are so selected with respect to the capacity of the spring 33, however, that the spring itself is incapable of effecting sufficient compression of the contact arms when they are in latching engagement with their respective fixed contacts to effect movement of the operating member from its projected position to its retracted position.

Although the engagement between the latching abutments of the contact arms and their respective fixed contacts is such as to effect latching of the operator 16 in its projected, operative position, counterclockwise rotation of the steering shaft 1 from the position shown in FIGURE 1 will cause the cam 15 to engage the nose 25 and exert a force thereon augmenting the force of the spring 33 and sufficient to move the operating member 16 to the right a distance such as to cause the latching abutments of the respective contact arms to move to the right past the maximum point of projection into the casing, whereupon the spring 33 is operable to restore the operating member to its fully retracted position.

As has been pointed out above, the abutment 56 is not an essential part of the construction. However, if it is used, it cooperates with the arm 35a and offers further resistance to movement of the operating member from its projected position to the retracted position by the spring 33. The abutment 56 and the arm 35a, therefore, can be considered auxiliary latching means.

The force required to initiate movement of the operator 16 from its projected position to its retracted position is resolved into two major components, one of which is axial of the operator, and the other of which is lateral. Consequently, only a portion of such force can be transmitted to any other apparatus associated with the hazard warning switch.

The disclosed embodiment is representative of the presently preferred form of the invention, but is intended to be illustrative rather than definitive thereof. The invention is defined in the claims.

What is claimed is:

1. A switch construction adapted for use with a movable cam and comprising a casing; an operating member mounted in said casing for reciprocating movements in a path between first and second positions; first electrically conductive contact means carried by said operating member for movement therewith between said positions; biasing means acting on said operating member constantly urging the latter toward said first position and being capable of returning said operating member from any position between said first and second positions to said first position; and second electrically conductive contact means supported by said casing in the path of movement of said first contact means for engagement by said first contact means in response to movement of said operating member from said first position to said second position, the engagement of said first and second contact means when said operating member is in said second position disabling said biasing means from returning said operating member to said first position and actuating means carried by said operating member for movement to a position engageable by said cam in response to movement of said operating member to said second position, engagement between said cam and said actuating means being operable to initiate return movement of said operating member to said first position.

2. The construction set forth in claim 1 wherein said actuating means comprises a projection carried by said operating member and extending externally of said casing when said operating member is in said second position.

3. The construction set forth in claim 2 including cam means mounted for engagement with said projection when said operating member is in said second position.

4. The construction set forth in claim 1 wherein at least one of said first and second contact means is movable relatively to the other of said contact means in a plane substantially normal to the path of movement of said operating member.

5. The construction set forth in claim 1 wherein first contact means has one portion thereof extending a greater distance than any other portion thereof into the path of movement of said second contact means.

6. The construction set forth in claim 1 wherein said second contact means extends laterally of the path of movement thereof.

7. In a vehicle having left-hand and right-hand signaling indicators and rotatable steering means for turning the vehicle selectively to the left and to the right: an operating member; means mounting said operating member adjacent said steering means for movement from a first position to a second position; conductive means carried by said operating member for movement therewith; spring means acting on said operating member for biasing the latter to said first position; contact means connected to both of said signaling indicators and mounted for engagement with said conductive means when said operating member is in said second position, said conductive means and said contact means constituting releasable latch means for releasably latching said operating member in said second position; and operating means carried by said steering means for rotation therewith and engageable with said operating member when the latter is in said second position, engagement of said operating member and said operating means effecting release of said latch means and enabling said spring means to restore said operating member to said first position.

8. The construction set forth in claim 7 wherein said conductive means comprises cantilever spring fingers.

9. The construction set forth in claim 8 wherein said fingers are bent adjacent their free ends to form abutments.

10. The construction set forth in claim 9 wherein said contact means comprise elements having non-planar surfaces against which the abutments of said fingers may seat.

11. The construction set forth in claim 7 including auxiliary releasable latch means constituted by said conductive means and said mounting means.

12. A switch construction comprising a casing; an operating member mounted in said casing for movements in a path between first and second positions; first electrically conductive contact means carried by said operating member for movement therewith between said positions; biasing means acting on said operating member constantly urging the latter toward said first position and being capable of returning said operating member from any position between said first and second positions to said first position; first latch means carried by and projecting laterally of the path of movement of said second contact means; second latch means carried by said casing and located in the path of movement of said first latch means for latching engagement therewith in response to movement of said operating member to said second position; and second electrically conductive contact means supported by said casing in the path of movement of said first contact means for engagement by said first contact means in response to movement of said operating member from said first position to said second position, the engagement of said first and second contact means and said first and second latch means when said operating member is in said second position disabling said biasing means from returning said operating member to said first position.

13. A switch construction comprising a casing; a reciprocable carrier mounted in said casing for movements between two positions; means for moving said carrier from one position to the other; resilient contact means carried by said carrier for movements therewith; fixed contact means mounted in said casing for engagement with said resilient contact means in response to movement of said carrier from one of said positions to the other, engagement between said fixed contact means and said resilient contact means deflecting and stressing the latter; means acting on said carrier and constantly biasing the latter to one of said positions, the stressing of said resilient contact means when said carrier is in the other position imposing a force on said carrier sufficient to disable said biasing means; and means for exerting on said carrier when the latter is in said other position a force augmenting said biasing means and of such magnitude as to initiate movement of said carrier from said other position toward said one position.

References Cited

UNITED STATES PATENTS

| 2,579,135 | 12/1951 | Alexander | 200—169 |
| 2,886,743 | 5/1959 | Hollins | 200—61.34 |
| 3,114,015 | 12/1963 | Magazanik | 200—61.27 |

FOREIGN PATENTS

| 97,033 | 5/1924 | Austria. |
| 348,788 | 2/1922 | Germany. |
| 653,899 | 12/1937 | Germany. |

BERNARD A. GILHEANY, *Primary Examiner.*

H. A. LEWITTER, *Assistant Examiner.*